(12) United States Patent
Kasturi et al.

(10) Patent No.: US 7,012,911 B2
(45) Date of Patent: Mar. 14, 2006

(54) METHOD AND APPARATUS FOR W-CDMA MODULATION

(75) Inventors: Nitin Kasturi, Los Gatos, CA (US); Rajat Rajinderkumar Dhawan, San Diego, CA (US); Daisuke Terasawa, San Diego, CA (US); Avneesh Agrawal, San Jose, CA (US); Arak Sutivong, Stanford, CA (US)

(73) Assignee: Qualcomm Inc., San Diego, CA (US)

( * ) Notice: Subject to any disclaimer, the term of this patent is extended or adjusted under 35 U.S.C. 154(b) by 881 days.

(21) Appl. No.: 09/871,563

(22) Filed: May 31, 2001

(65) Prior Publication Data

US 2003/0031158 A1    Feb. 13, 2003

(51) Int. Cl.
*H04B 7/20* (2006.01)
*H04J 3/02* (2006.01)
*H04Q 7/00* (2006.01)

(52) U.S. Cl. ............. 370/342; 370/328; 370/537; 455/522

(58) Field of Classification Search ........... 370/229, 370/252, 335–394, 412, 441, 469–537, 294–328; 375/141–147, 250, 295, 341–347; 455/67, 455/69, 234, 235, 450–552, 102–103, 255–258; 714/701–801
See application file for complete search history.

(56) References Cited

U.S. PATENT DOCUMENTS

| | | | |
|---|---|---|---|
| 5,721,745 A * | 2/1998 | Hladik et al. | 714/755 |
| 6,182,265 B1 * | 1/2001 | Lim et al. | 714/786 |
| 6,373,831 B1 * | 4/2002 | Secord et al. | 370/342 |
| 6,473,442 B1 * | 10/2002 | Lundsjo et al. | 370/537 |
| 6,738,370 B1 * | 5/2004 | Ostman | 370/349 |
| 6,744,744 B1 * | 6/2004 | Tong et al. | 370/320 |

(Continued)

FOREIGN PATENT DOCUMENTS

EP    1045522    10/2000

(Continued)

OTHER PUBLICATIONS

Dai Lin, et al., "A new implementation algorithm for multiplexing and channel coding scheme in W-CDMA" ICCT 2000 International Conference: pp. 1685-1688, vol. 2, XP001093859.

(Continued)

*Primary Examiner*—Man U. Phan
(74) *Attorney, Agent, or Firm*—Philip R. Wadsworth; Charles D. Brown; Kenyon Jenckes (57) ABSTRACT

Techniques for efficient W-CDMA modulation are disclosed. In one aspect, a multiplexing/coding chain for use in modulation such as that defined by the W-CDMA specification is disclosed. In another aspect, transport blocks are processed and concatenated, utilizing memory efficiently. This aspect has the further benefit of preparing transport channels for efficient subsequent processing. It also allows for ease of interface with the transport channel source. In another aspect, the use of repeated channel coding is used in lieu of an interleaver memory to provide channel coding and interleaving. These aspects, collectively, yield the advanced benefits of a system, such as W-CDMA, in a hardware efficient manner. The techniques described herein apply equally to both access points and access terminals. The techniques are not limited to W-CDMA systems; they are quite suitable to other systems requiring the various benefits the invention offers. Various other aspects of the invention are also presented.

39 Claims, 3 Drawing Sheets

U.S. PATENT DOCUMENTS

2001/0014113 A1 * 8/2001 Imura .................... 375/141
2001/0021229 A1 * 9/2001 Belaiche ................. 375/295
2002/0044612 A1 * 4/2002 Sipola ................... 375/295
2003/0066018 A1 * 4/2003 Yu et al. ................ 714/792
2004/0180627 A1 * 9/2004 Dabak et al. ........... 455/67.16

FOREIGN PATENT DOCUMENTS

EP          1091515          4/2001
WO          0021246          4/2000

OTHER PUBLICATIONS

ETSI TS 121 212 Universal Mobile Telecommunications System: ETSI TS 125 212 V4.0.0 (1000) p. 8-55, XP002221906.

* cited by examiner

METHOD AND APPARATUS FOR W-CDMA MODULATION

BACKGROUND

1. Field

The present invention relates generally to communications, and more specifically to a novel and improved method and apparatus for W-CDMA modulation.

2. Background

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (5) some other standards. A system that implements the High Rate Packet Data specification of the cdma2000 standard is referred to herein as a high data rate (HDR) system. The HDR system is documented in TIA/EIA-IS-856, "CDMA2000 High Rate Packet Data Air Interface Specification". Proposed wireless systems also provide a combination of HDR and low data rate services (such as voice and fax services) using a single air interface.

Modern CDMA system specifications, such as those referenced above, incorporate a variety of requirements and prescribe various signaling schemes in order to achieve the advantages attributed to them. As additional requirements and signaling schemes grow, so does the complexity and quantity of resources needed to support them. However, in a mobile wireless environment, it is desirable to minimize hardware and current consumption, in an effort to produce user equipment that is cost-effective and power-efficient in a compact form factor.

Modulators and demodulators are commonly deployed in wireless communication systems. Modulators format and process various kinds of data, such as voice, video, internet, or other data, using various techniques to prepare it for transmission. These techniques include CRC generation, ciphering, channel coding, interleaving, rate matching, channelization, scrambling, etc. Demodulators are designed to extract the data from the formatted transmission after it is received. The W-CDMA standard provides requirements and delineates certain processing techniques for modulation of data according to that standard. The W-CDMA standard is no less complex than its predecessors, and the desire for cost-effective and power-efficient devices within W-CDMA systems is ever present.

As such, there is a need in the art for modulators that effectively implement the requirements of complex standards while minimizing associated hardware costs, power consumption, and complexity of system design.

SUMMARY

Embodiments disclosed herein address the need for efficient W-CDMA modulators. In one aspect, a multiplexing/coding chain for use in modulation such as that defined by the W-CDMA specification is disclosed. In another aspect, transport blocks are processed and concatenated, utilizing memory efficiently. This aspect has the further benefit of preparing transport channels for efficient subsequent processing. It also allows for ease of interface with the transport channel source. In another aspect, the use of repeated channel coding is used in lieu of an interleaver memory to provide channel coding and interleaving. These aspects, collectively, yield the advanced benefits of a system, such as W-CDMA, in a hardware efficient manner. The techniques described herein apply equally to both access points and access terminals. The techniques are not limited to W-CDMA systems; they are quite suitable to other systems requiring the various benefits the invention offers. Various other aspects of the invention are also presented.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
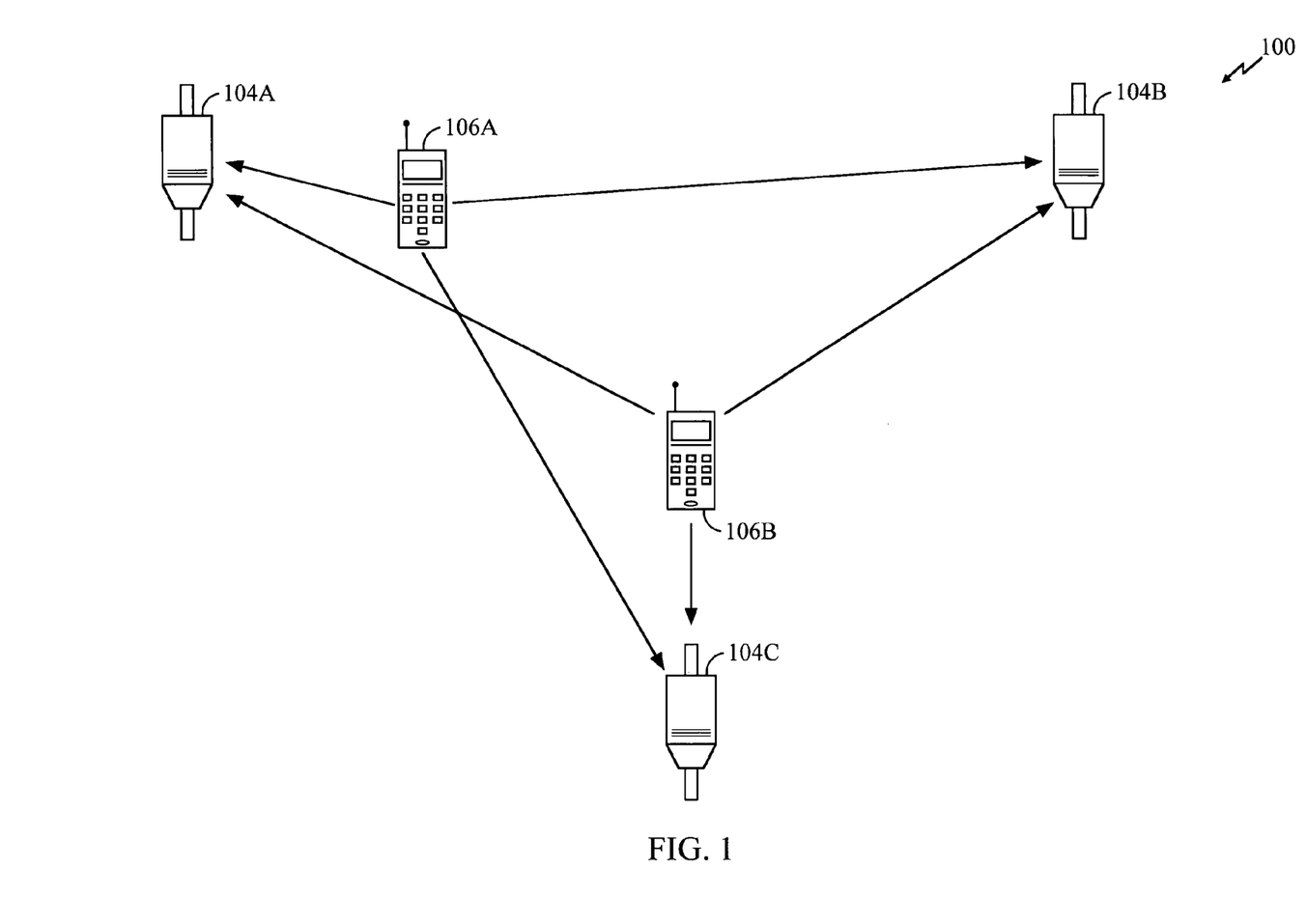
FIG. 1 is a general block diagram of a wireless communication system capable of supporting a number of users.

FIG. 1 is a diagram of a wireless communication system 100 that supports a number of users, and which can implement various aspects of the invention. System 100 may be designed to support one or more CDMA standards and/or designs (e.g., the IS-95 standard, the cdma2000 standard, the HDR specification, the W-CDMA standard). For simplicity, system 100 is shown to include three access points 104 (which may also be referred to as base stations) in communication with two access terminals 106 (which may also be referred to as remote terminals or mobile stations). The access point and its coverage area are often collectively referred to as a "cell".

Depending on the CDMA system being implemented, each access terminal 106 may communicate with one (or possibly more) access points 104 on the forward link at any given moment, and may communicate with one or more access points on the reverse link depending on whether or not the access terminal is in soft handoff. The forward link (i.e., downlink) refers to transmission from the access point to the access terminal, and the reverse link (i.e., uplink) refers to transmission from the access terminal to the access point.

For clarity, the examples used in describing this invention will assume access terminals as the originator of signals and access points as receivers and acquirers of those signals, i.e. signals on the reverse link. Those skilled in the art would understand that access points as well as access terminals can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Figure 2:
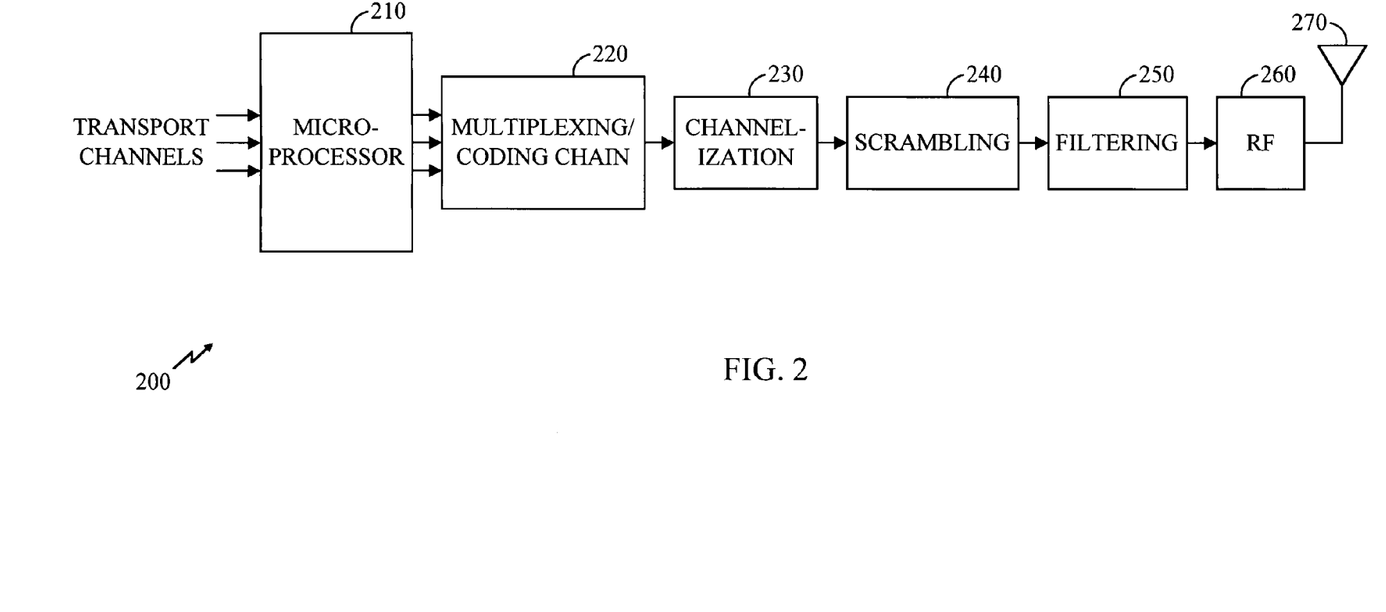
FIG. 2 depicts a block diagram of a modulator.

FIG. 2 depicts a block diagram of modulator 200 configured as one embodiment of the present invention. For clarity, only the subset of blocks of modulator 200 are shown that relate to the present invention. In the following discussion, the embodiments will be described with reference to their implementation according to the W-CDMA standard, where the various aspects of the invention will be appreciated. The principles of this invention are not limited to W-CDMA systems, however, and are readily applicable to other standards by those of skill in the art.

It is assumed for this discussion that microprocessor 210 is performing processing and control in general for modulator 200, although those skilled in the art will recognize that often multiple processors are employed, whether classified as microprocessors or digital signal processors, and various configurations of processors and/or special purpose hardware can be readily substituted one for the other in accordance with the principles of this invention.

Various forms of data can be modulated and transmitted by modulator 200. Examples include voice, video, IP data traffic, and other types of data. One or more data streams, labeled transport channels in FIG. 2, are delivered to microprocessor 210. The sources of these transport channels may vary, and are not shown. Microprocessor 210 receives the transport channels and delivers them to multiplexing/coding chain 220. Multiplexing/coding chain 220 formats and processes the transport channels, and delivers the results to channelization block 230. In the W-CDMA standard, these results are referred to as a coded composite transport channel (CCTrCh). The details of the processing that takes place in multiplexing/coding chain 220 are described in further detail below with respect to FIG. 3.

Channelization block 230 receives data from multiplexing/coding chain 220 and covers it according to a channelization scheme. In W-CDMA systems, the data is covered using orthogonal variable spreading factor (OVSF) codes. Other CDMA systems employ Walsh codes for channelization. The channelized data is then scrambled in scrambling block 240. Various scrambling sequences are known in the art, and the scrambling code for W-CDMA systems is defined in the standard.

Filtering block 250 operates on the scrambled data to provide baseband filtering prior to delivery to RF block 260. Those of skill in the art will recognize that tradeoffs can be made in allocating filtering and RF band processing between digital and analog hardware, and these techniques apply with equal force to the present invention. After upconversion in RF block 260, the data is then transmitted through antenna 270.

Figure 3:
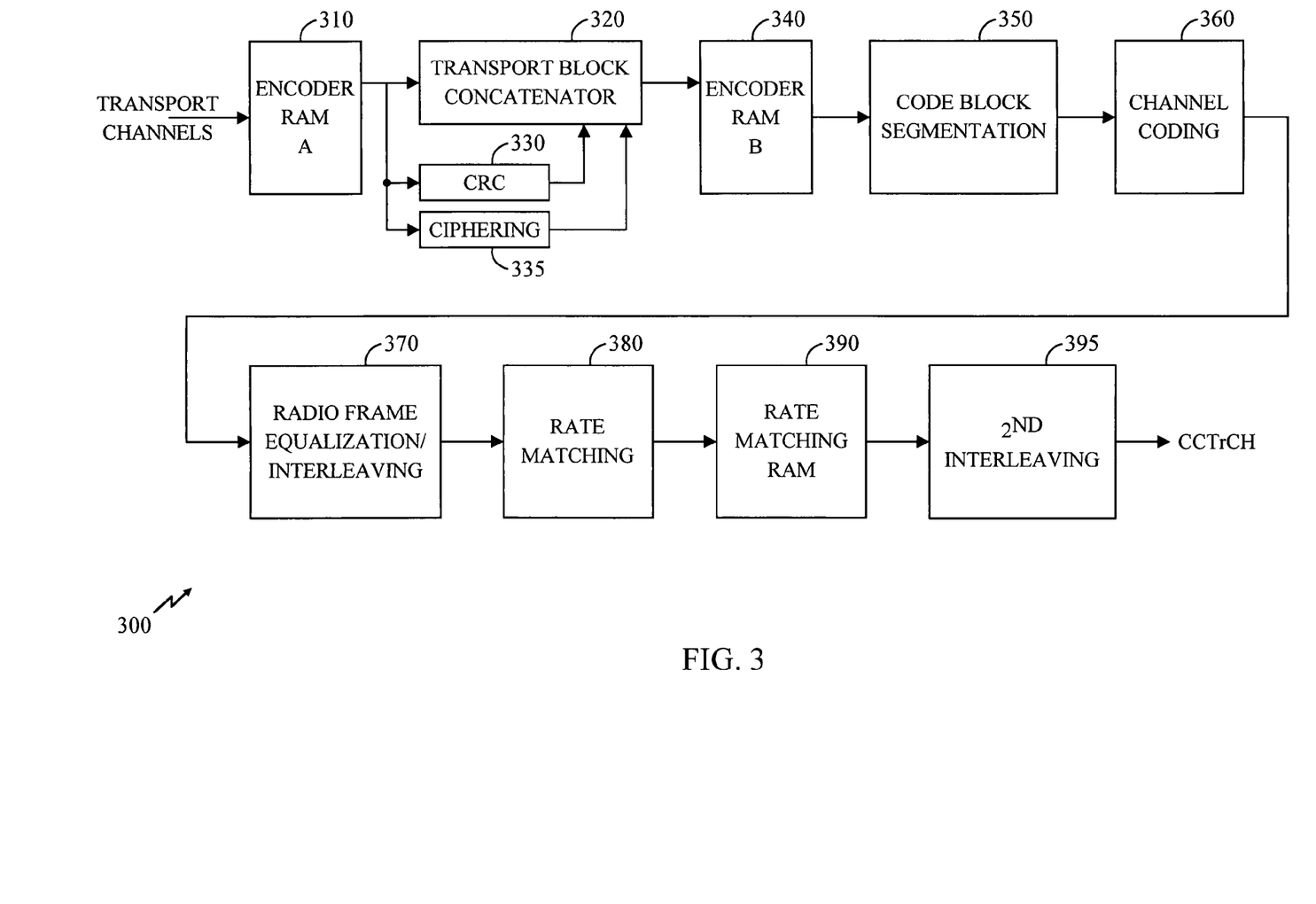
FIG. 3 is an embodiment of a multiplexing/coding chain configurable for use within a modulator.

FIG. 3 depicts multiplexing/coding chain 300. Multiplexing/coding chain 300 is one embodiment which can be deployed as multiplexing coding chain 220 in FIG. 2. Data corresponding to a number of transport channels is written into encoder RAM A 310. In one embodiment, the number of transport channels supported is eight.

In general, transport channels can contain data from a variety of sources, such as voice, video, IP packets, and so forth. To facilitate higher level protocols associated with such varied data, transport channels can have varied service levels associated with them. The W-CDMA standard defines the transmission time interval (TTI) to provide service level distinction. TTI provides a measure of the latency allowed with the associated data. W-CDMA supports TTI values of 80 ms, 40 ms, 20 ms, and 10 ms. To meet the service level criteria, data will be transmitted within its associated TTI.

Data for a transport channel is written to encoder RAM A 310 in packets, each packet consisting of a header and a data portion. The packets, also known as transport blocks, are written into a portion of encoder RAM A 310 assigned for that transport channel. This location is dynamically determined since transport channel data will ultimately be removed from encoder RAM A 310 for further processing, and space will become available as this occurs. The packets may also be preceded by a control word, used for passing parameters specific to the transport channel for use in multiplexing/coding chain 300. Encoder RAM A 310 accepts control words, headers, and packet data to be written each on a word-aligned basis, which allows simplicity in the design of the device delivering the data. However, this word-alignment may result in gaps of unused bits among the data in encoder RAM A 310.

Transport block concatenator 320 reads transport block data from encoder RAM A 310 and provides it in compacted form to encoder RAM B 340. For each transport channel, any control words are removed and parsed, and unused bits between headers and packet data are removed. In addition, when programmed to do so, transport block concatenator 320 appends cyclic redundancy check (CRC) bits to the end of the transport block, which bits are generated in CRC block 330 from the transport block read from encoder RAM A 310. Optional ciphering block 335 performs ciphering on the data being read from encoder RAM A 310, replacing the uncoded bits with the proper coded bits, when ciphering is enabled. The resulting data, whether ciphered or not, and containing a CRC or not, is written in encoder RAM B 340 such that each transport channel is bit-packed, and contains no unused bits between valid data.

To illustrate the function of blocks 310–340, as just described, consider the following example. Assume 8-bit wide encoder RAMs A and B, 310 and 340 respectively, and two transport blocks (a and b) with an 8-bit control word, 5 header bits, 20 data bits and 4 CRC bits each. Table 1 shows the data format for encoder RAM A 310, wherein the subscript a or b denotes which of transport blocks a or b the bit denotes, and letters c, h and d denote control, header, and data bits, respectively. Unused bits are marked with an X. The column headers 7 through 0 identify which bit in the 8-bit word the columns signify.

TABLE 1

| 7 | 6 | 5 | 4 | 3 | 2 | 1 | 0 |
|---|---|---|---|---|---|---|---|
| $c_a7$ | $c_a6$ | $c_a5$ | $c_a4$ | $c_a3$ | $c_a2$ | $c_a1$ | $c_a0$ |
| $h_a4$ | $h_a3$ | $h_a2$ | $h_a1$ | $h_a0$ | X | X | X |
| $d_a19$ | $d_a18$ | $d_a17$ | $d_a16$ | $d_a15$ | $d_a14$ | $d_a13$ | $d_a12$ |
| $d_a11$ | $d_a10$ | $d_a9$ | $d_a8$ | $d_a7$ | $d_a6$ | $d_a5$ | $d_a4$ |
| $d_a3$ | $d_a2$ | $d_a1$ | $d_a0$ | X | X | X | X |
| $c_b7$ | $c_b6$ | $c_b5$ | $c_b4$ | $c_b3$ | $c_b2$ | $c_b1$ | $c_b0$ |
| $h_b4$ | $h_b3$ | $h_b2$ | $h_b1$ | $h_b0$ | X | X | X |
| $d_b19$ | $d_b18$ | $d_b17$ | $d_b16$ | $d_b15$ | $d_b14$ | $d_b13$ | $d_b12$ |
| $d_b11$ | $d_b10$ | $d_b9$ | $d_b8$ | $d_b7$ | $d_b6$ | $d_b5$ | $d_b4$ |
| $d_b3$ | $d_b2$ | $d_b1$ | $d_b0$ | X | X | X | X |

Table 2 shows the data format for encoder RAM B 340 following operation by transport block concatenator 320. The symbols in Table 2 follow the format of those in Table 1, with the addition of CRC bits. Note that the control words have been removed, as have the unused bits.

TABLE 2

| 7 | 6 | 5 | 4 | 3 | 2 | 1 | 0 |
|---|---|---|---|---|---|---|---|
| $h_a4$ | $h_a3$ | $h_a2$ | $h_a1$ | $h_a0$ | $d_a19$ | $d_a18$ | $d_a17$ |
| $d_a16$ | $d_a15$ | $d_a14$ | $d_a13$ | $d_a12$ | $d_a11$ | $d_a10$ | $d_a9$ |
| $d_a8$ | $d_a7$ | $d_a6$ | $d_a5$ | $d_a4$ | $d_a3$ | $d_a2$ | $d_a1$ |
| $d_a0$ | $CRC_a3$ | $CRC_a2$ | $CRC_a1$ | $CRC_a0$ | $h_b4$ | $h_b3$ | $h_b2$ |
| $h_b1$ | $h_b0$ | $d_b19$ | $d_b18$ | $d_b17$ | $d_b16$ | $d_b15$ | $d_b14$ |
| $d_b13$ | $d_b12$ | $d_b11$ | $d_b10$ | $d_b9$ | $d_b8$ | $d_b7$ | $d_b6$ |
| $d_b5$ | $d_b4$ | $d_b3$ | $d_b2$ | $d_b1$ | $d_b0$ | $CRC_b3$ | $CRC_b2$ |
| $CRC_b1$ | $CRC_b0$ | ... | ... | ... | ... | ... | ... |

It is possible to utilize only a single encoder RAM, rather than encoder RAMS A & B, 310 and 340, respectively. However, such a configuration requires that the microprocessor which writes the transport blocks perform bit manipulations to ensure that the unused bits are removed, also leaving space to append any required CRC bits. Alternatively, a complex addressing scheme could be generated to access the various data, CRC, and header bits from a single encoder RAM. Ciphering in either of these alternatives also adds complexity. Embodiments configured as shown in FIG. 3, however, provide the benefit of a simplified interface to the microprocessor, and generate contents in encoder RAM B 340 in such a manner as to provide additional benefits, described in further detail below.

Transport blocks are written into encoder RAM B 340 in locations corresponding to decreasing order of TTI. For example, 80 ms TTI transport blocks are written in the lowest RAM addresses, and 10 ms TTI transport blocks are written in higher address locations. The benefit of this method is that since larger TTI blocks remain in the RAM longer than smaller TTI blocks, the soonest used blocks (those with lower TTI) are located near the end of contiguous RAM space, where new small TTI blocks can quickly replace them.

As a counterexample, to demonstrate the drawback of not using this method, consider an N-bit transport block with a 10 ms TTI and a transport block with an 80 ms TTI. Suppose that the N-bit transport block with 10 ms TTI is written starting at address 0, and the 80 ms TTI block is written directly after it starting at address N. The N-bit transport block with 10 ms TTI will be dispatched during the next 10 ms interval, but the 80 ms TTI block may remain for up to 8 consecutive 10 ms intervals. Consider a second 10 ms TTI transport block with N+1 bits. Since the 80 ms TTI block remains, there is not enough contiguous space at address 0 for the second 10 ms TTI block. The only remedy is to have an increased RAM size to accommodate writing additional blocks while leaving lower sections unused, or to generate a very complicated addressing scheme to allow transport blocks to be written non-contiguously.

On the other hand, if the 80 ms block was written to the lower addresses in RAM, followed by the N-bit 10 ms TTI block, then, after the 10 ms TTI block was dispatched, a new 10 ms TTI block could be written in its place. Therefore, it is advantageous to fill the encoder RAM B 340 with transport blocks in the order of descending TTI.

Ultimately, the transport blocks stored in encoder RAM B 340 will be delivered for channel coding in block 360. In W-CDMA systems, there are three channel coding options: convolutional coding, turbo coding, or no coding. Prior to delivery for channel coding, the transport channels must be selected for reading from encoder RAM B 340, the process of which essentially multiplexes the various transport channels into one contiguous channel. In some cases, the number of bits in a encoder RAM B 340 corresponding to a transport channel is greater than the coding block size required by the channel coding algorithm. In these cases, the transport channel data must be segmented into multiple code blocks. Similarly, if the transport channel data is too small, it must be padded with additional bits (typically zeros) to make up a code block. Additionally, tail bits often must be appended to code blocks, depending on the coding algorithm. The multiplexing and segmenting functions just described are carried out in code block segmentation 350 to deliver transport channel data from encoder RAM B 340 to channel coding block 360.

In W-CDMA systems, the code block size for convolutional coding is 504 bits, and that for turbo coding is 5113. Convolutional coding calls for 8 tail bits and turbo coding calls for 6 tail bits.

Another benefit of bit-packing transport channels into encoder RAM B 340 can be seen with respect to turbo coding. Turbo coding combines encoding of the stream of bits coming from code block segmentation 350 with encoding of the results from random accesses to the data in encoder RAM B 340. If the transport channel data being encoded from encoder RAM B 340 was not contiguous, a very complicated addressing circuit would have to be devised.

Various methods can be employed to produce the functionality required by various blocks throughout multiplexing/coding chain 300, such as code block segmentation 350 and transport block concatenator 320. Such methods will be readily ascertainable by those skilled in the art. One technique which can be applied to keep track of various parameters relating to transport channels, such as location in encoder RAM A 310, location in encoder RAM B 340, length of the respective transport channel data (concatenated and non-concatenated), order for multiplexing, and other settings for processing a particular transport channel, is to maintain a lookup table (LUT), accessible for reading and writing by the controlling microprocessor as well as various blocks in multiplexing/coding chain 300. Lookup table techniques are well known in the art, and such a lookup table is not shown in FIG. 3.

As an example, the order of multiplexing the various transport channels which takes place in code block segmentation 350 may be done according to a higher layer protocol. This may be under control of the microprocessor which is delivering the transport channels to multiplexing/coding chain 300 (not shown). This same microprocessor can write a value in a lookup table for each transport channel which, when accessed by code block segmentation 350, directs the order that the various transport channels are read from encoder RAM B 340 and therefore multiplexed for delivery to channel coding 360.

As described above, the multiplexed transport channel stream is segmented into code blocks and channel coding is performed according to any of a variety of coding algorithms (including no coding) in block 360. The results of channel coding block 360 are delivered to radio frame equalization/interleaving block 370.

Radio frame equalization is the simple process of adding one or more bits to the output of channel coding 360 such that the proper number of output bits are available for first interleaving (a second interleaving will be described below). Conceptually, first interleaving could take place by storing output from channel coding 360 in an R×C matrix (R rows and C columns). In general, the various elements of the matrix can be picked out in an order specified by some general interleaving algorithm.

The W-CDMA standard defines first interleaving such that C is set equal to TTI divided by 10 ms. Each column corresponds to one radio frame worth of data. The data is read out column-by-column according to a predetermined manner. Implementing this method of interleaving requires that code symbols must be stored for all the transport channels in a RAM (assuming the code symbols are generated in channel coding block 360 once and the output is stored in this RAM). This RAM could be quite large and therefore expensive.

As an alternative, multiple encodings can be used instead of deploying a RAM to store all the output of channel coding block 360. During each radio frame, bits from the output stream generated by channel coding block 360 are selected based on the TTI of the transport channel and the location in the stream relating to the desired column. Of course, the term column as used here does not relate to an actual matrix or RAM, as conceptualized above. Rather, the operation being described here produces the same results as if a RAM was filled and a column was subsequently read from it.

The following example serves to clarify the method for radio frame equalization and first interleaving just described. Assume a transport channel coding block of 10 bits (including any tail bits) with a 40 ms TTI and rate 1/3 coding. Table 3 shows the output of channel coding block 360 collected into four columns. The cells in the table contain a bit number which corresponds to the output of channel coding block 360. So, the first three output bits correspond to the first input bit, since a rate 1/3 code is being used. These three bits correspond to bits 0, 1, and 2 in the table. The tenth input to channel coding block 360 is the last input bit, since in our example the transport block contained ten bits, and the corresponding output bits are 27, 28, and 29. As described above, the matrix representation of Table 3 serves only to clarify the relationship between columns of a hypothetical RAM and the actual stream of output bits being generated. Note that bits 30 and 31 do not come from channel coding block 360, since only 30 bits of coded output will be created for a 10 bit transport block. Instead, bits 30 and 31 are filler bits generated to perform radio frame equalization. They are necessary to complete columns 2 and 3.

TABLE 3

| Column 0 | Column 1 | Column 2 | Column 3 |
|---|---|---|---|
| 0 | 1 | 2 | 3 |
| 4 | 5 | 6 | 7 |
| 8 | 9 | 10 | 11 |
| 12 | 13 | 14 | 15 |
| 16 | 17 | 18 | 19 |
| 20 | 21 | 22 | 23 |
| 24 | 25 | 26 | 27 |
| 28 | 29 | 30 | 31 |

The order in which columns are to be read will be specified according to the type of system being deployed. In W-CDMA, for the TTI specified in this example, the order in which columns are read is given as follows: Column 0, Column 2, Column 1, and Column 3. In each radio frame, a subset of the encoder output stream is equalized with a filler bit if necessary and delivered to rate matching block 380. In this example, during the first radio frame Column 0 is to be selected. Therefor bits 0, 4, 8, 12, 16, 20, 24, and 28 will be delivered to rate matching block 380. In the second radio frame, Column 2 is to be selected. Hence, bits 2, 6, 10, 14, 18, 22, 26, and 30 will be delivered to rate matching block 380. In the third radio frame, Column 1 is to be selected. Hence, bits 1, 5, 9, 13, 17, 21, 25, and 29 will be delivered to rate matching block 380. Finally, in the fourth radio frame, Column 3 is to be selected. Hence, bits 3, 7, 11, 15, 19, 23, 27, and 31 will be delivered to rate matching block 380. As this example has demonstrated, by repeating the channel coding process in channel coding block 360 a certain number of times (in this case 4), the use of a RAM can be eliminated and the desired interleaving can be performed by selecting a certain subset of channel coding block 360 output. In relation to the W-CDMA specification, this operation accomplishes both first interleaving and radio frame segmentation.

The previous example illustrated the procedure for a 40 ms TTI. As defined above, the number of columns corresponds to the TTI divided by 10 ms. So for TTI of 80 ms, the number of columns would be 8. For 40 ms, the number of columns would be 4, as just described. For 20 ms, the number of columns would be 2. For 10 ms, there would be only a single column.

To accomplish the column ordering defined by the W-CDMA specification, a bit reversed version of a radio frame counter can be used to determine which column to select. For 80 ms TTI, the three lowest bits are used. For 40 ms, the two lowest bits are used. For 20 ms, the least significant bit is used. For 10 ms, there is only one column, so the column choice is clear. In relation to the example just described, as a radio frame counter's two least significant bits cycle through the states, 00, 01, 10, and 11, the bit reversal of these states cycle through 00, 10, 01, and 11, respectively. This corresponds to the prescribed ordering of columns 0, 2, 1, and 3, as described above. The use of this technique follows for TTI values in general.

Rate matching block 380 receives the output of radio frame equalization/interleaving block 370, performs rate matching on that output, and delivers the results to rate matching RAM 390. Rate matching is a procedure whereby bits in a transport channel are punctured or repeated such that the aggregate number of bits of all active transport channels conform to the number of bits available for the selected bit rate. Rate matching algorithms are known in the art, and the principles of the present invention apply with any rate matching algorithm. The W-CDMA specification prescribes a rate matching algorithm which can be employed in this embodiment (details not shown).

The output of rate matching block 380 is stored sequentially in rows in rate matching RAM 390. Rate matching RAM 390 is then accessed in column-wise fashion by second interleaving block 395. Rate matching RAM 390 may be double buffered to allow new results to be written without over-writing previous results before they are accessed by second interleaving block 395. The order in which columns are read from rate matching RAM 390 by second interleaving block 395 will be dictated by the type of system being implemented.

The resultant output from second interleaving block 395 is a coded, composite, transport channel (CCTrCh) which can be delivered for transmission on a physical channel. An example of such a channel is given in FIG. 2 as blocks 230–270, described above.

The embodiment just described with respect to FIG. 3 is useful for implementing the requirements of the W-CDMA specification. It is more generally useful for any specification which calls for similar processing with parameters, channel coding algorithms, rate matching algorithms, ciphering algorithms, etc., which differ from the W-CDMA standard. Furthermore, those of skill in the art will recognize that the present invention also applies to systems utilizing any subset of the blocks described with respect to FIG. 2 and FIG. 3. Those of skill in the art will also recognize that the ordering of blocks in the multiplexing/coding chain embodiments described above can be altered without departing from the scope of the present invention. It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A modulator, including a multiplexing/coding chain, operable with a first memory in which transport channels, comprised of transport blocks, are stored and a second memory, comprising;
   a concatenator for reading transport blocks from the first memory, removing bits not intended for transmission from the read transport blocks, and storing the concatenated transport blocks in the second memory;
   a channel coder for coding the transport channels from the second memory, wherein the coding of subsets of the transport channels can be repeated; and
   an interleaver for receiving the coded transport channels and selecting subsets of each coded transport channel and the repeated coded transport channels to produce a coded, interleaved data stream.

2. The modulator of claim 1, further comprising a cyclic redundancy check (CRC) generator for computing CRCs with the read transport blocks and appending the CRCs to the concatenated transport blocks stored in the second memory.

3. The modulator of claim 2, further comprising a ciphering block for ciphering the transport blocks to be concatenated and stored in the second memory.

4. The modulator of claim 1, wherein the concatenated transport blocks are stored according to descending transmission time intervals in the second memory.

5. The modulator of claim 1, further comprising a code block segmentor for segmenting transport channels greater than the channel coder black size and padding transport channels smaller than the channel coder block size.

6. The modulator of claim 1, further comprising a radio frame equalizer for adding filler bits to the output of the channel coder.

7. The modulator of claim 1, further comprising a rate matcher for puncturing and repeating bits of the coded, interleaved dan stream to conform to data rates for the transport channels to produce a rate-matched, coded, interleaved data stream.

8. The modulator of claim 7, further comprising a second interleaver for interleaving the rate-matched, coded, interleaved data stream to produce a coded, composite transport channel.

9. A multiplexing/coding chain, operable with a first memory in which transport channels, comprised of transport blocks, are stored and a second memory, comprising:
   a concatenator for reading transport blocks from the first memory, removing bits not intended for transmission from the read transport blocks, and storing the concatenated transport blocks in the second memory;
   a channel coder for coding the transport channels from the second memory, wherein the coding of subsets of the transport channels can be repeated; and
   an interleaver for receiving the coded transport channels and selecting subsets of each coded transport channel and the repeated coded transport channels to produce a coded, interleaved data stream.

10. The multiplexing/coding chain of claim 9, further comprising a cyclic redundancy check (CRC) generator for computing CRCs with the read transport blocks and appending the CRCs to the concatenated transport blocks stored in the second memory.

11. The multiplexing/coding chain of claim 10, further comprising a ciphering block for ciphering the transport blocks to be concatenated and stored in the second memory.

12. The multiplexing/coding chain of claim 9, wherein the concatenated transport blocks are stored according to descending transmission time intervals in the second memory.

13. The multiplexing/coding chain of claim 9, further comprising a code block segmentor for segmenting transport channels greater than the channel coder block size and padding transport channels smaller than the channel coder block size.

14. The multiplexing/coding chain of claim 9, further comprising a radio frame equalizer for adding filler bits to the output of the channel coder.

15. The multiplexing/coding chain of claim 9, further comprising a rate matcher for puncturing and repeating bits of the coded, interleaved data stream to conform to data rates for the transport channels to produce a rate-matched, coded, interleaved data stream.

16. The multiplexing/coding chain of claim 15, further comprising a second interleaver for interleaving the rate-matched, coded, interleaved data stream to produce a coded, composite transport channel.

17. An access terminal, for use in a CDMA system, including a multiplexing/coding chain, operable with a first memory in which transport channels, comprised of transport blocks, are stored and a second memory, comprising:
 a concatenator for reading transport blocks from the first memory, removing bits not intended for transmission from the read transport blocks, and storing the concatenated transport blocks in the second memory;
 a channel coder for coding the transport channels from the second memory, wherein the coding of subsets of the transport channels can be repeated; and
 an interleaver for receiving the coded transport channels and selecting subsets of each coded transport channel and the repeated coded transport channels to produce a coded, interleaved data stream.

18. The access terminal of claim 17, further comprising a cyclic redundancy check (CRC) generator for computing CRCs with the read transport blocks and appending the CRCs to the concatenated transport blocks stored in the second memory.

19. The access terminal of claim 18, further comprising a ciphering block for ciphering the transport blocks to be concatenated and stored in the second memory.

20. The access terminal of claim 17, wherein the concatenated transport blocks are stored according to descending transmission time intervals in the second memory.

21. The access terminal of claim 17, further comprising a code block segmentor for segmenting transport channels greater than the channel coder block size and padding transport channels smaller than the channel coder block size.

22. The access terminal of claim 17, further comprising a radio frame equalizer for adding filler bits to the output of the channel coder.

23. The access terminal of claim 17, further comprising a rate matcher for puncturing and repeating bits of the coded, interleaved data stream to conform to data rates for the transport channels to produce a rate-matched, coded, interleaved data stream.

24. The access terminal of claim 23, further comprising a second interleaver for interleaving the rate-matched, coded, interleaved data stream to produce a coded, composite transport channel.

25. A W-CDMA system, including a multiplexing/coding chain, operable with a first memory in which transport channels, comprised of transport blocks, are stored and a second memory, comprising:
 a concatenator for reading transport blocks from the first memory, removing bits not intended for transmission from the read transport blocks, and storing the concatenated transport blocks in the second memory;
 a channel coder for coding the transport channel from the second memory, wherein the coding of subsets of the transport channels can be repeated; and
 an interleaver for receiving the coded transport channels and selecting subsets of each coded transport channel and the repeated coded transport channels to produce a coded, interleaved data stream.

26. The W-CDMA system of claim 25, further comprising a cyclic redundancy check (CRC) generator for computing CRCs with the read transport blocks and appending the CRCs to the concatenated transport blocks stored in the second memory.

27. The W-CDMA system of claim 26, further comprising a ciphering block for ciphering the transport blocks to be concatenated and stored in the second memory.

28. The W-CDMA system of claim 25, wherein the concatenated transport blocks are stored according to descending transmission time intervals in the second memory.

29. The W-CDMA system of claim 25, further comprising a code block segmentor for segmenting transport channels greater than the channel coder block size and padding transport channels smaller than the channel coder block size.

30. The W-CDMA system of claim 25, further comprising a radio frame equalizer fir adding filler bits to the output of the channel coder.

31. The W-CDMA system of claim 25, further comprising a rate matcher for puncturing and repeating bits of the coded, interleaved data stream to conform to data rates for the transport channels to produce a rate-matched, coded, interleaved data stream.

32. The W-CDMA system of claim 31, further comprising a second interleaver for interleaving the rate-matched, coded, interleaved data stream to produce a coded, composite transport channel.

33. A method of modulation comprising:
 reading transport blocks stored in a first memory; and
 writing only those bits of the transport blocks intended for transmission into a second memory in concatenated form
 channel coding transport channels comprised of said transport blocks stored in the second memory;
 repeating the channel coding step;
 selecting subsets from each of the repeated channel coding outputs to produce a coded, interleaved data stream.

34. The method of claim 33, further comprising:
 computing a CRC for each of the transport blocks; and
 appending the CRCs to the concatenated transport blocks when writing to the second memory.

35. The method of claim 33, further comprising ciphering the concatenated transport blocks prior to storage in the second memory.

36. The method of claim 33, further comprising channel code block segmentation wherein transport channels larger than channel code blocks are segmented and transport channels smaller than channel code blocks are padded.

37. The method of claim 33, further comprising radio frame equalization wherein filler bits are inserted into the output of the channel coding step.

38. The method of claim 33, further comprising rate matching wherein bits are punctured and repeated to conform to data rates for the transport channels.

39. The method of claim 38, further comprising interleaving the output of the rate matching step.

* * * * *